United States Patent
Russo

[11] Patent Number: 6,033,576
[45] Date of Patent: *Mar. 7, 2000

[54] CHEMICAL WASTE TREATMENT

[75] Inventor: Gaetano Russo, Cheltenham, Australia

[73] Assignee: Hyperno Proprietary Limited, Cheltenham, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/649,598

[22] PCT Filed: Nov. 25, 1994

[86] PCT No.: PCT/AU94/00729

§ 371 Date: Jul. 22, 1996

§ 102(e) Date: Jul. 22, 1996

[87] PCT Pub. No.: WO95/14526

PCT Pub. Date: Jun. 1, 1995

[30] Foreign Application Priority Data

Nov. 26, 1993 [AU] Australia ................ PM 2672

[51] Int. Cl.[7] ........................................ C02F 1/24
[52] U.S. Cl. ............ 210/704; 210/708; 210/712; 210/718; 210/738; 210/749; 210/750; 210/752; 210/758; 210/765; 210/916; 210/919; 261/DIG. 75; 423/210; 423/243.01; 423/243.02; 423/245.2
[58] Field of Search ................. 210/704, 705, 210/708, 712, 718, 738, 749, 750, 752, 758, 765, 919, 916; 208/184, 185, 188; 261/DIG. 75; 423/210, 243.01, 243.02, 245.2

[56] References Cited

U.S. PATENT DOCUMENTS

| | | | |
|---|---|---|---|
| 3,884,803 | 5/1975 | Traylor | 210/704 |
| 4,026,817 | 5/1977 | Ciuti et al. | 252/312 |
| 4,137,163 | 1/1979 | Young | 210/703 |
| 4,162,970 | 7/1979 | Zlokarnik | 261/DIG. 75 |
| 4,252,654 | 2/1981 | Leitzke et al. | 210/760 |
| 4,416,610 | 11/1983 | Gallagher, Jr. | 431/4 |
| 4,874,521 | 10/1989 | Newman et al. | 210/639 |
| 5,087,377 | 2/1992 | Josefik | 210/703 |
| 5,314,613 | 5/1994 | Russo | 208/184 |
| 5,350,511 | 9/1994 | Sakurada | 210/205 |
| 5,403,475 | 4/1995 | Allen | 210/168 |

FOREIGN PATENT DOCUMENTS

| | | |
|---|---|---|
| B-10809/83 | 11/1982 | Australia . |
| 91819/82 | 12/1982 | Australia . |
| B-12972/88 | 8/1988 | Australia . |
| 30343/92 | 7/1993 | Australia . |
| 2 385 438 | 3/1977 | France . |
| 2 484 862 | 6/1980 | France . |
| 2 331 462 | 5/1983 | Germany . |
| 2 089 234 | 6/1982 | United Kingdom . |
| WO 94/00224 | 1/1994 | WIPO . |
| WO 94/02234 | 2/1994 | WIPO . |

*Primary Examiner*—Peter A. Hruskoci
*Attorney, Agent, or Firm*—Reising, Ethington, Barnes, Kisselle, Learman & McCulloch, P.C.

[57] ABSTRACT

A method for accelerating the treatment of chemical wastes, particularly recalcitrant wastes such as spent caustic, from the oil, gas, chemical, and petrochemical industries, in which normally slow physical mass transfer of different fluid phases, as well as other chemical reactions, are facilitated. The method involves mixing together the different fluid phases and delivering the mixture to a reaction vessel in the form of an aerosol and froth which provides a large surface area between the phases. The aerosol and froth mixture is maintained and replenished for a period of time sufficient to effect mass transfer and stripping of the contaminants to a selected level of completion. The method enables the provision of more environmentally acceptable wastes for disposal.

14 Claims, 2 Drawing Sheets

CHEMICAL WASTE TREATMENT

This application is a 371 of PCT/AU94/00729, filed Nov. 25, 1994.

This invention relates to a process which facilitates physical mass transfer and/or chemical reactions which are normally slow and is specifically directed to processes for use in the treatment of recalcitrant wastes, such as spent caustic used in the oil, gas, chemical and petrochemical industries. The description of the invention will be directed, by way of example, to the treatment of spent caustic, without in any way limiting the generality of the process.

BACKGROUND AND PRIOR ART

Spent caustic is the hazardous and toxic waste product of gas and liquid sweetening processes that use caustic materials (such as caustic soda, NaOH and caustic potash, KOH). The caustic reacts with acid gases such as hydrogen sulfide, carboxylic acids, carbon dioxide, mercaptans, phenols and hydrogen cyanide. The waste product containing salts of these acids with usually some residual caustic is termed spent caustic. The spent caustic often also contains condensed and dissolved hydrocarbons and odorous organic compounds.

The traditional disposal route for spent caustic, the direct disposal of the untreated waste to the environment, is no longer acceptable and disposal to KRAFT pulp and paper mills is becoming increasingly difficult as statutory authorities worldwide move towards enforcing conservation and recycling practices at the mills.

Techniques for converting this waste to an environmentally acceptable and/or benign waste have included; oxidation followed by neutralisation and biological treatment; strong acid neutralisation followed by gas or steam stripping of the toxic acid gases and their incineration, and disposal of the neutral salt solution to the environment often after biological treatment; continuous carbonation in a combination carbonation and stripping tower; batch carbonation and stripping.

Oxidation and strong acid neutralisation processes suffer severely from the limitations imposed by the techniques available for good pH control. pH control is so variable and unreliable that it can lead to the release of toxic gases (such as hydrogen sulfide, $H_2S$) to the environment and low pH effluent water.

Continuous carbonation processes as described in The American Petroleum Institute Manual on Disposal of Refinery wastes, Volume III utilising common carbonation and stripping columns have not been successfully applied. This, in spite of the fact that batch carbonation and stripping processes have been successfully applied for some forty years.

The only existing successful carbonation processes are batch processes employing long residence times and small treatment volume capability.

The principal object of this invention is to provide a treatment process which improves the mass transfer of gases between phases and which can also compensate for the slowness in reaction rate inherent in many chemical reactions so as to improve (reduce) on the overall time required to complete the chemical process compared with known conventional means of carrying out the process.

A more specific object is the provision of an unique continuous carbonation and stripping process which overcomes the limitations that hinder the successful operation of existing continuous carbonation processes.

SUMMARY OF THE INVENTION

The invention includes a method of accelerating a chemical reaction in which a first fluid reactant in a reaction vessel is mixed with a second fluid reactant so as to allow the chemicals in the two reactants to react together, the mixing being effected by employing a mixing device designed to intimately mix the fluids together whilst providing a large surface area of the second reactant relative to the first reactant, in order to aid in mass transfer.

The invention also includes a method as set out above being a method of treating chemical waste in which the first reactant is a waste fluid in the reaction vessel, is mixed with a second fluid so as to allow the chemicals in the two fluids to react together, the mixing being effected by employing a mixing device designed to intimately mix the fluids together so as to provide a large surface area of the second fluid relative to the first fluid, in order to aid in mass transfer.

Preferably the mixing device is a jet compressor or the like. The mixing action results in millions of bubbles forming resulting in a semi-stable froth forming in the reaction vessel. This froth provides a large surface area for an extended time before bubble/froth collapse occurs thus enhancing time and surface area available for mass transfer and reaction. It is the unique interaction between the bubble and aerosol phases mixing within the reaction vessel that allows successful mass transfer and reaction.

In this invention the combination of the large surface area, residence time in the froth and bubble phase and the increase in the gas partial pressure each act to facilitate the reaction and thus reduce the necessary residence time in the reaction vessel. Because of the efficiency gained by this invention in increasing mass transfer and reducing the overall reaction time, the process can be a continuous one resulting in enhanced capacity and flexibility over the conventional batch carbonation process and a higher carbon dioxide utilisation efficiency.

The invention includes a treatment process in which a liquid in a reaction vessel is treated by a gas to remove some of the volatile components via a gas stripping mechanism with the remainder of the contaminants in the liquid reacting with carbon dioxide in the gas to form relatively harmless and environmentally benign compounds.

A major feature of the invention is the use of a jet compressor to intimately mix the liquid and gas so that a large surface area is created between the liquid and gas phases. The jet compressor also compresses the gas from the gas inlet of the device to a higher pressure at the discharge of the device.

A jet compressor is a device that has a particular geometry in which a high pressure fluid (usually liquid) is passed through a small nozzle into a chamber where it mixes with a low pressure fluid (usually gas). The two fluids then flow together along the chamber which converges to a narrow mixing section of the device and then diverges to a chamber of larger diameter. The converging mixing diverging geometry gives the jet compressor its characteristic ability to compress the low pressure fluid to a higher pressure at the discharge of the device.

It will be appreciated that the jet compressor is uniquely used as a mixer, compressor, heat and mass transfer reactor.

The invention also includes a process utilising carbon dioxide ($CO_2$) to neutralise and strip spent caustic of its toxic and malodorous compounds utilising at one or more stages, each stage comprising a residence time vessel, a pump and a jet compressor or the like, the jet compressor to intimately mix the caustic and the carbon dioxide which compressor provides a large surface area of gas relative to the liquid for mass transfer and causes an increase in the gas partial pressure in the reaction vessel to well above atmospheric pressure.

It is preferred that there is means, whereby the process includes a capability of varying the residence time to ensure that low reaction rate steps can proceed substantially to completion. This is achieved by providing a capability to vary the feed rate of spent caustic to the process. In this way the residence time can be varied from a few minutes to infinity but practically to a number of weeks. The process in effect can be varied from a batch mode to a continuous mode and is very flexible.

THEORETICAL BACKGROUND

For this treatment a typical petrochemical plant spent caustic will be used, which spent caustic contains free sodium hydroxide (NaOH), sodium sulfide ($Na_2S$), sodium carbonate ($Na_2CO_3$), odorous sulfur containing organics and hydrocarbons. The aim of the continuous carbonation process is to neutralise any free caustic, remove hydrogen sulfide, odorous components and hydrocarbons and produce a safe buffer solution of sodium carbonate/sodium bicarbonate for direct conventional disposal, such as to an existing sewer system. The neutralisation, stripping and conversion is to be achieved with carbon dioxide ($CO_2$) gas; preferably a waste gas such as boiler or furnace flue gas or cat cracker regeneration gas.

For this process to progress a number of chemical and physical reactions must proceed. Firstly $CO_2$ must be absorbed from the gas phase into the liquid phase, i.e.

$$CO_{2(g)} \rightleftharpoons CO_{2(l)} \quad\quad\quad 1$$

Then the $CO_{2(l)}$ must react with water, i.e.

$$CO_{2(l)} + H_2O \rightleftharpoons HCO_3^- + H^+ \quad\quad\quad 2$$
$$HCO_3^- \rightleftharpoons H^+ + CO_3^- \quad\quad\quad 3$$

The $H^+$ thus released must then react with excess $OH^-$ in solution (i.e. free caustic), i.e.

$$H^+ + OH^- \rightleftharpoons H_2O \quad\quad\quad 4$$

When $OH^-$ from free caustic is exhausted further absorption of $CO_2$ is required to convert $Na_2S$ to $NaHS$ and then to $NaHCO_3$.

Excess $CO_2$ and other gases (eg. $N_2$ in the flue gas) acting as carrier gas, is then used to strip $H_2S$ from solution. These equations are:

$$CO_2 + H_2O + S^- \rightleftharpoons HCO_3^- + HS^- \quad\quad\quad 5$$
$$HS^- + CO_{2(l)} + H_2O \rightleftharpoons HCO_3^- + H_2S_{(l)} \quad\quad\quad 6$$
$$H_2S_{(l)} \xrightarrow{\text{carrier gas}} H_2S_{(g)} \quad\quad\quad 7$$

It can be seen that in order to strip $H_2S$ from solution there must be a continuous supply of $H^+$. This supply is dependent on the following reactions proceeding $$CO_{2(g)} \rightleftharpoons CO_{2(l)} + H_2O \rightleftharpoons HCO_3^- + H^+$$

(i.e. 1 and 3 above proceeding). Both of these reactions however are slow rate limiting steps. The speed is affected by $CO_2$ concentration, partial pressure and surface area for mass transfer from gas to liquid. In the conventional continuous carbonation stripping tower, reaction time available is short and surface area is limited. In the batch process residence time can be as long as is required to achieve complete reaction. However because surface area is limited the reaction time is very long, equipment size/capacity ratios are high and $CO_2$ utilisation is poor compared to the present invention.

This invention typically uses a multiple stage process, and although 1 to 20 stages are possible it is preferable to have 3 to 5 with the ability to handle long residence times of hours to weeks but preferably 8 to 20 hours for the total process. It employs jet compressors designed to intimately mix liquid and gas providing a large surface area for mass transfer and increase the gas partial pressure to well above atmospheric pressure. All this is achieved in one operation per stage so that the jet compressor is uniquely used as a mixer, compressor, heat and mass transfer device. Residence time is provided by a residence time drum or vessel. Motive energy to compress the gas and mix it with the liquid is provided by a pump. This combination of residence time drum, jet compressor (reactor, mixer, compressor) and pump system comprises a reaction stage.

In addition to chemical reaction, this combination results in an efficient stripping process for odorous organics and hydrocarbons so that the final effluent from this process contains negligible volatile or malodorous compounds. This is in total contrast with acid neutralisation or oxidation processes which do not remove the malodorous organics from their final liquid effluents.

The gaseous products from this process may be disposed of by any number of conventional technologies including incineration, sulfur recovery or sulfur absorption processes.

The process described converts highly alkaline spent caustic starting off at pH of approximately 13.5 or greater to a benign and in most cases not only environmentally acceptable but beneficial buffer solution of pH 6.0 to 8.0. This buffer solution of (alkali) carbonate/bicarbonate can be disposed directly to sewer and, because of its buffering properties, will, in most cases, eliminate the need to adjust effluent pH from a plant which conventionally uses strong acids or bases to achieve effluent pH control. This results in better utilisation of chemical resources and a lessened impact on the environment of manufacturing processes.

This continuous carbonation process employs three distinct reaction phases. Phase one is the neutralisation phase where pH is dropped from 13.5 or greater to pH 9.5 to 10 and reactions 1, 2, 3 and 4 are the predominant reaction. Phase two is the bicarbonation phase where pH is dropped from pH 9.5 to 10 to pH 6.0 to 8.0 and reactions 1, 2 and 5 predominate. Phase three is the stripping phase where reactions 1, 6 and 7 predominate. These reaction phases may be spread over 1 to 20 reaction stages but preferably 3 to 5 stages.

The reduced pH allows the reaction to equilibrate to the right and the $H_2S$ in the gaseous form is purged from the system.

A regeneration stage may be added to the last reaction stage of this system which regenerates $CO_2$ from the bicarbonate effluent of the last stage and reduces the amount of flue gas required. This regeneration stage is particularly useful if external compression means in addition to the jet compressors is being employed. In this stage the liquid bicarbonate mixture is lowered in pressure and heated to 90 to 100° C. converting the bicarbonate to carbonate liberating $CO_2$ by the reaction.

$$HCO_3^- \xrightleftharpoons{heat} CO_{2(l)} + OH^- \qquad 8$$

$$CO_{2(l)} \rightleftharpoons CO_{2(g)} \qquad 9$$

The $OH^-$ thus liberated increases the pH of the liquid mixture to approximately pH 9 to 10 but such a pH is normally acceptable for liquid effluents. The $CO_2$ liberated can be taken overhead into the first gas contact stage. This increases the $CO_2$ partial pressure in all subsequent stages, thereby improving the driving force for neutralising and gas stripping.

The process can be used to neutralise alkaline streams using flue gases, or acid streams using alkaline gases such as ammonia.

A specific troublesome alkaline stream which can be tackled by this process is the product from conventional spent caustic oxidation processes. This stream contains free caustic and thiosulfate/sulfate salts in addition to hydrocarbons including benzene and pungent, toxic, malodorous organics.

This process, in addition to converting the free caustic to benign beneficial bicarbonate will also strip off these nasty components for recovery, incineration or other conventional treatment.

Whilst the above discussion has centered on the treatment of spent caustic, the process invention can be equally applied to improve other processes which have kinetic and/or mass transfer limiting steps. Such processes include oxidation processes which involve dissolution of oxygen into a liquid (for example for the biological oxidation of liquid wastes or the direct oxidation of organic molecules; the Benfield process for sweetening gases; amine treating processes; dehydration processes; oxidation of drying oil in the paint and resin industries; and the production of asphalt).

The vigorous agitation and creation of large gas/liquid surface area induced by the process together with the long residence times employed can be used to age colloidal precipitates to enlarge the physical size of the precipitate and allow its easy removal by filtration or settling including gravity settling and hydrocyclones.

The same vigorous agitation and fine gas/liquid dispersion combined with the long residence time offered by the process can enhance the effectiveness of flotation processes for the flotation and recovery of oily residues in waste streams.

The same process can be used in liquid/liquid processes where the process requires the reaction and/or mass transfer between immiscible liquids and/or gases especially where partitioning may be involved such as in the reaction separation of the various plant growth regulators known as gibberellins from fermentation broths.

The same process may be used to speed up fermentation and other biological processes requiring the intimate contacting of air or oxygen or carbon dioxide or other gas for the efficient propagation of reactions.

THE DRAWINGS

DETAILED DESCRIPTION

Figure 1:
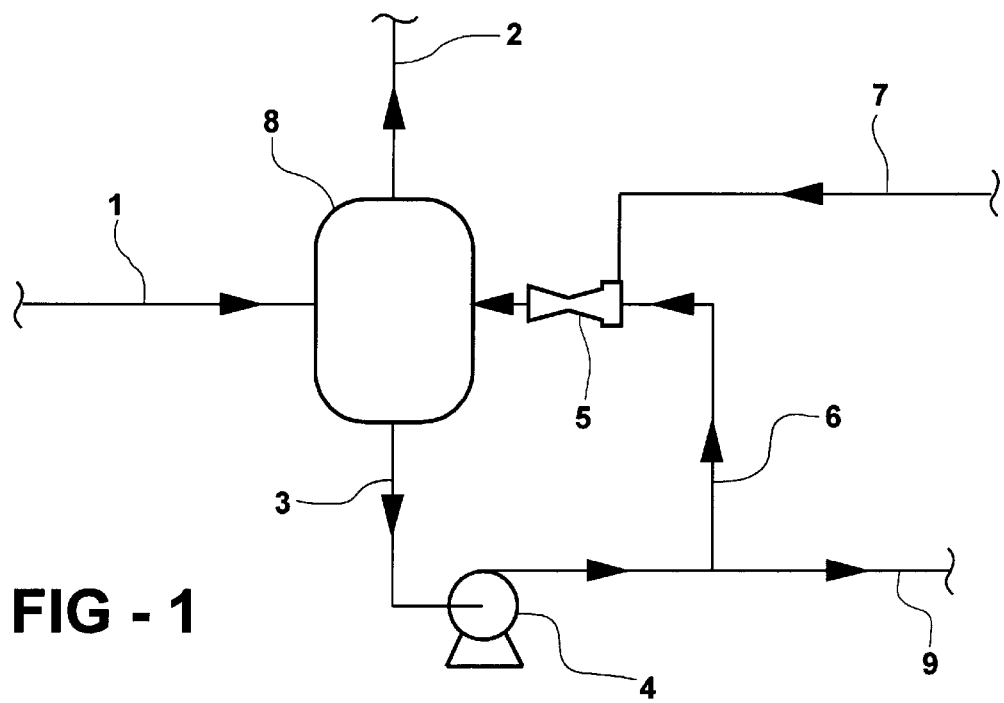
FIG. 1 is a schematic diagram of the basic reaction stage.

FIG. 1 discloses the basic reaction stage. Liquid spent caustic from a source thereof, enters the residence time section of the reactor 8 through inlet line 1. It is taken out of the reactor through liquid line 3 where it has kinetic and pressure energy imparted to it by circulating pump 4. The high energy liquid is pumped to jet compressor 5 through line 6 where the energy inputted by the pump is dissipated through a nozzle and converted into mixing energy and compression energy within the jet compressor. Flue gas to the jet compressor is induced from a source through gas line 7 into the jet compressor and intimately mixed and compressed with the circulating liquid spent caustic. The compression undergone by the gas is up to a 2:1 pressure ratio. In the jet compressor the following takes place.

1. Liquid and gas are intimately mixed.

2. Mass and energy transfer takes place between gas and liquid.

3. Literally millions of small bubbles (foam) and droplets in the form of a mist is created leading to enormous liquid/gas surface area. The liquid/gas interface thus created leads to improved mass transfer to and from the liquid phase versus conventional means of gas/liquid contact such as tower packing, tower trays spray nozzles, or gas diffusers.

4. The gas pressure is increased by a ratio of approximately 2:1 thereby increasing the $CO_2$ partial pressure and improving the mass transfer of the $CO_2$ from the flue gas to the liquid phase.

The mist coalesces in the residence time drum 8 settling out into the liquid phase and the gas/liquid foam created exits the jet compressor into the residence time drum where, because of its relative stability, gas/liquid mass transfer can continue over an extended time from the surface of the foam bubbles to and from the gas. As mist coalescing and bubble collapse occurs, gas leaner in $CO_2$ exits the reactor through line 2 and the decontaminated liquid is separated from the gas. This gas also carries with it $H_2S$ and any other organic or inorganic gases or vapours transferred to it in the gas/liquid exchange that has taken place in the reactor. The reaction stage comprises the combination of the vessel (or drum), the pumps and the jet compressor and interconnecting piping. Liquid flows into the reaction stage are balanced by liquid outflows from the reaction stage through line 9.

Where neutralisation and stripping of hydrocarbons and malodorous organics only is required, such as described above for neutralisation of the product of spent caustic oxidation processes, a single reaction stage is most often all that is required to convert the waste to an environmentally benign and beneficial baking soda solution.

Figure 2:
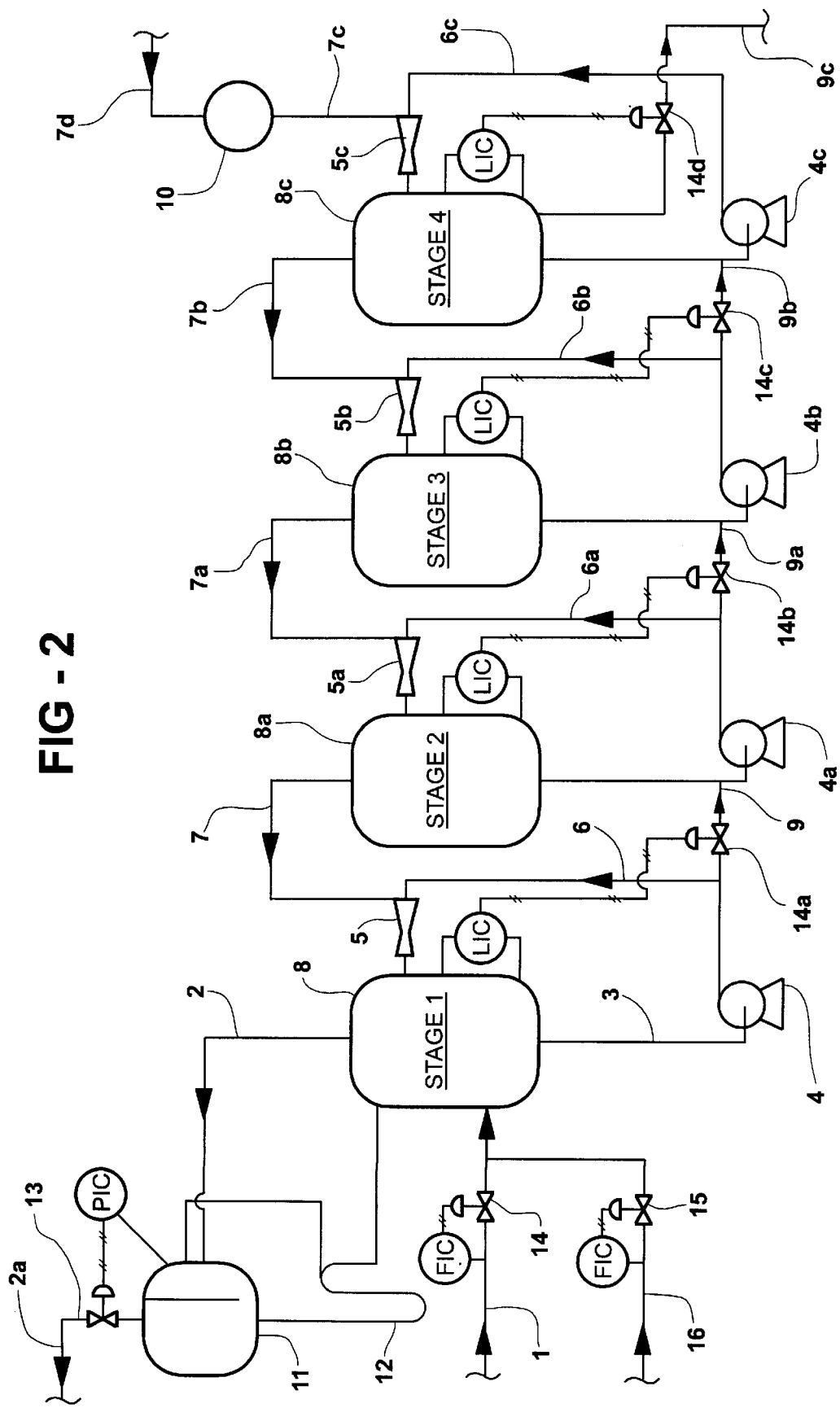
FIG. 2 is a schematic diagram of a plurality of basic reaction stages coupled together in series.

FIG. 2 shows how a number of these basic reactor stages may be connected into a number of stages to achieve the completion of the three phases of reaction described in the discussion. In this illustration four reactor stages are employed.

Stage 1

Spent caustic typically containing 20,000 ppm sodium sulfide, 10% caustic and 2% sodium carbonate is fed to the first reactor through feed line 1 at a controlled rate through flow control valve 14. Fresh water is added to the spent caustic through line 16 at a controlled rate through the flow control valve 15. The relative rates of spent caustic and water are determined so as to ensure that the concentration of the various salts through the different reaction stages is kept below the saturation level to ensure precipitation does not occur. The neutralisation phase occurs principally in the first reaction stage comprising 8, 4 and 5 together with interconnecting piping. $CO_2$ depleted gas together with $H_2S$ and hydrocarbon and other sulfur containing vapours leave the first stage through flame arrestor 11 under pressure control; controlled by pressure controller 13 through line 2a for incineration or other convenient disposal method.

Stage 2

Neutralised liquid leaves stage 1 on level control through level control valve 14a to go to stage two comprising 8a, 4a, 5a and attendant piping. In this stage bicarbonation and some stripping of $H_2S$ takes place together with stripping of hydrocarbons and odorous sulfur compounds. These gases leave Stage 2 for further contacting and reaction of $CO_2$ in Stage 1. The liquid leaves Stage 2 partially depleted of its sulfur, hydrocarbons and sulfur components and at a pH approaching pH 8.

Stage 3

This comprises 8b, 4b, 5b and attendant pipework. The largely bicarbonated liquid from Stage 2 has its bicarbonation completed in this stage and has almost all of its sulfur, hydrocarbons and sulfur compounds stripped out of it in this third stage. pH leaving this stage is between pH 6 and 8 dependant on $CO_2$ partial pressure and salt concentration. The $H_2S$, hydrocarbon and sulfur compound rich gas is routed to Stage 2 for further reaction.

Stage 4

This is a polishing stage comprising 8c, 4c, 5c and attendant pipework. In this stage bicarbonated liquid is reacted with flue gas rich in $CO_2$. The hot flue gas is routed from a furnace/boiler stack or other $CO_2$ source through duct 7a cooled in cooling exchanger 10 and routed to the reactor through 7c. In this stage the last traces of $H_2S$, hydrocarbons and sulfur compounds are stripped from the bicarbonated spent caustic. Gas containing these traces of $H_2S$, hydrocarbon and sulfur compounds are taken overhead to stage 3 for further reaction. The sodium bicarbonate solution, sulfur and contaminant free, is sent to sewer through level control valve 14 and line through 9c.

Typical pressures through the process are at 7d 100 kPa, at stage 4 200 kPa, at stage 3 250 kPa, at stage 2 300 kPa and at stage 1 300 kPa. Pressure however is one of the design variables to be optimised on number of stages and can be boosted by conventional compression ahead of stage 4 to as high as 1000 kPa to reduce equipment size in large systems. The higher $CO_2$ partial pressure provided by the higher operating pressure reduces the stable pH in the second reation phase of the process to as low as pH 6. This pushes reaction 6 and 7 markedly to the right resulting in more rapid removal of $H_2S$ from the liquid phase.

Figure 3:
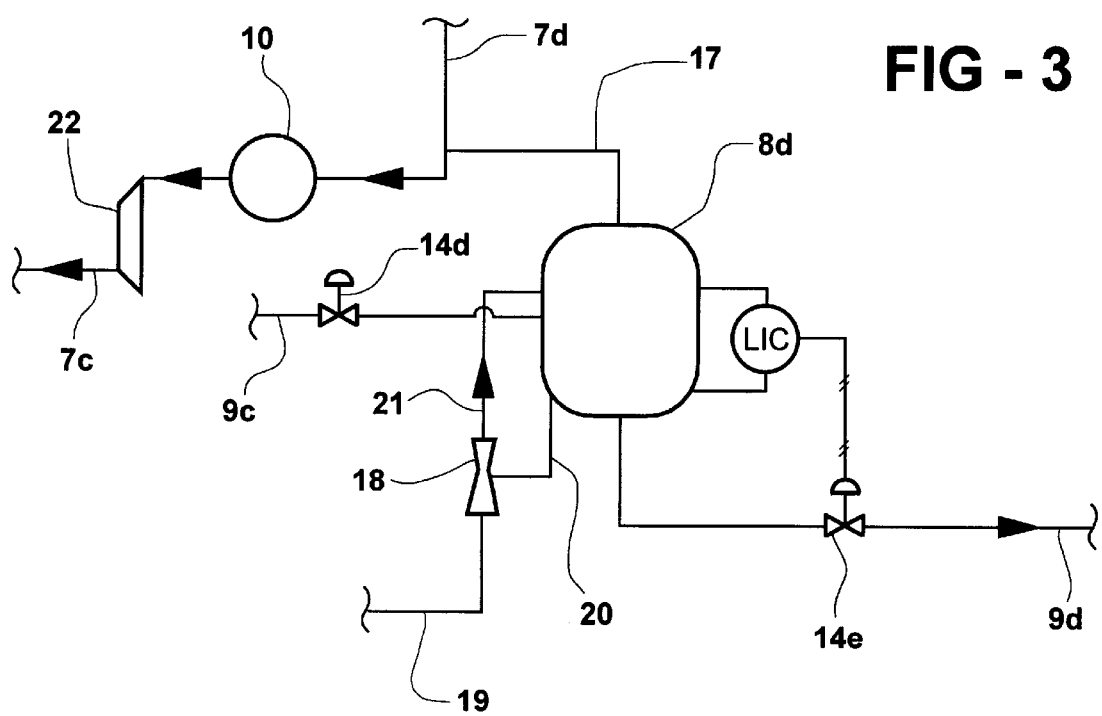
FIG. 3 is a schematic diagram of a regeneration stage which may form part of the apparatus.

FIG. 3 shows a regeneration stage which may be added after the polishing stage, stage 4, to improve the efficiency of use of the carbon dioxide. In this stage bicarbonate product is fed to the reactor vessel 8d through line 9c and control valve 14d. The reactor vessel liquid is heated by circulating it from line 20 via a steam jet ejector 18 which uses low pressure steam from line 19 to both heat the bicarbonate solution and provide the motive energy to pump the solution from the bottom of the reactor vessel and the vapour space through line 21. Supplementary heating with direct steam injection or other conventional heating means may also be employed. On heating, the bicarbonate decomposes liberating carbon dioxide, $CO_2$, per the following equations.

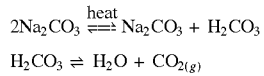

$$H_2CO_3 \rightleftharpoons H_2O + CO_{2(g)}$$

The $CO_2$ evolved is wet as any water vapour carries over the overhead line 17 which routes it to the flue gas line 7d to the flue gas cooler 10. The addition of $CO_2$ to stream 7d increases the $CO_2$ partial pressure in the flue gas, markedly improving reaction rate and reducing the amount of flue gas required by the process. The inclusion of a conventional compressor (22) downstream of gas cooler (10) can further enhance the efficient utilisation of $CO_2$ and reduce the amount of flue gas required by the process. Sodium carbonate with a pH of about pH 10 is routed to sewer through control valve 14e and line 9d usually through a cooler for eventual disposal to the environment.

The flow rate through the process is limited by $CO_2$ partial pressure, temperature, concentration of sulfide, strength of the spent caustic and any contaminants which may limit or accelerate reaction rate. This process is essentially a continuous process. However another unique property of this invention is that it can be readily varied from continuous to fully batch. This flexibility can be achieved by loading up with spent caustic, stop feed and start the pumps and flue gas and run it until all sulfide, organic sulfur compounds and hydrocarbons have been removed and then dump to sewer and start again or it can be run on a continuous basis varying the rate of feed to suit the circumstances.

Various modifications can be made in the process of the invention without departing from the spirit and scope thereof.

The claims defining the invention are:

1. A method of accelerating the reaction rate of a chemical reaction between molecules initially contained in two separate liquid and gas phases one of which phases contains contaminants and the other of which is capable of removing said contaminants, said method comprising delivering said phases from separate sources along separate paths to a jet compressor; mixing said phases in said jet compressor to form an aerosol and froth mixture; delivering the mixture and the separate liquid phase to a reaction vessel in which said mixture expands to provide a large surface area between said phases for aiding mass transfer, said jet compressor and said reaction vessel comprising a reaction stage; maintaining said mixture in said reaction vessel for a sufficient residence time to enable said chemical reaction to proceed to a selected level of completion to strip contaminants from said one of said phases; separating the resulting liquid and gas phases; and pumping the resultant liquid phase to said jet compressor to compress said gas phase.

2. The method according to claim 1 in which the liquid phase is a mixture of immiscible liquids.

3. The method according to claim 1 wherein the liquid phase is spent caustic.

4. The method according to claim 3 wherein the gas phase is carbon dioxide.

5. The method according to claim 4 wherein the carbon dioxide neutralizes and strips the spent caustic of toxic and malodorous compounds.

6. The method according to claim 4 wherein the carbon dioxide is a waste flue gas.

7. The method according to claim 1 wherein the gas phase is oxygen.

8. The method according to claim 1 in which the liquid phase is alkaline waste material.

9. The method according to claim 1 in which the liquid phase is acid waste material.

10. The method according to claim 1 wherein said liquid phase contains oil.

11. The method according to claim 1 including varying said residence time to permit the reaction to reach a selected level of completion.

12. The method according to claim 1 including a plurality of said reaction stages coupled to one another in series.

13. The method according to claim 12 wherein the number of said reaction stages is as many as 20.

14. The method according to claim 12 wherein there are 3–5 of said reaction stages.

* * * * *